Oct. 13, 1959  P. D. JOHNSON  2,908,072
BRAZING PASTE AND PROCESS OF BRAZING
Filed June 25, 1956
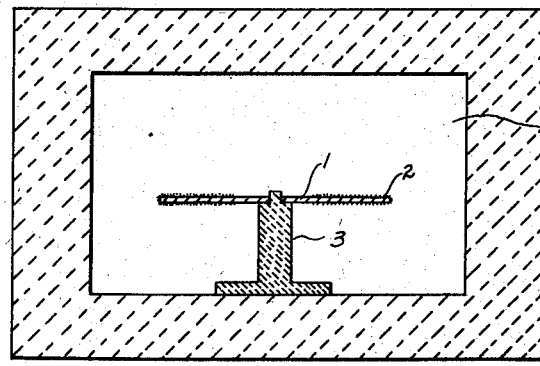
PAUL D. JOHNSON
INVENTOR.
BY G. G. Christensen
ATT'Y.

United States Patent Office 2,908,072
Patented Oct. 13, 1959

2,908,072
BRAZING PASTE AND PROCESS OF BRAZING
Paul D. Johnson, Gary, Ind., assignor to The Glidden Company, Cleveland, Ohio, a corporation of Ohio
Application June 25, 1956, Serial No. 593,442
7 Claims. (Cl. 29—473.1)

This invention relates to non-settling brazing pastes utilizing heat-depolymerizable butene polymers in the carrier or vehicle of such pastes. It also relates to an improved process wherein hard carbide particles are brazed simultaneously to both sides of a sheet or disc by means of the improved pastes.

Brazing pastes employing heat-depolymerizable petroleum gel vehicles have been described in the Klinker U.S. Patents 2,566,339; 2,594,313 and 2,606,132. While such pastes have been found to be commercially useful for many brazing tasks, there are some situations in which the pastes are unsatisfactory. For instance, it is desirable to be able to braze abrasive powders such as hard metal carbides (e.g., tungsten carbide, chromium carbide, titanium carbide, etc.) to both sides of a metal sheet or disc, and it would be especially desirable to effect the brazing of both sides in a single furnacing operation. Such a situation requires the brazing paste to exhibit adhesive qualities, especially on the underside of the disc or sheet, which are retained at elevated temperatures long enough to permit the abrasive powder to become attached to the underside of the article. The hydrocarbon-vehicle pastes of the Klinker patents supra do not possess such adhesive qualities; instead the vehicle thins out rather rapidly as it is heated and allows the brazing metal powders and the hard carbide powders to drop off the undersurface.

I have now found that brazing pastes which utilize polybutenes of the characteristics described hereinafter have the needed qualities which permit carbide and other metallic abrasive powders to be brazed successfully to the underside of a metal sheet or disc, thereby making it possible for both sides of the abrasive sheet or disc to be brazed in a single furnacing treatment. I have also found that the pastes have very desirable non-running and bridging qualities when hot which enable them to be used to advantage in a wide variety of other brazing tasks.

Accordingly, it is an object of this invention to provide improved brazing pastes utilizing as the essential heat depolymerizable hydrocarbon thereof at least one polymeric butene material which exhibits adhesive and improved non-running qualities when hot.

It is another object to provide a process for securing brazed joints in assemblies wherein gravity tends to pull the brazing pastes out of or away from the intended joint.

These and other objects will be apparent from the following description of the invention taken in conjunction with the attached drawings in which the single figure is a vertical sectional view of a furnace chamber having therein an abrasive disc which has previously been coated on predetermined areas of both faces with a film of brazing paste and then with hard carbide powders which are to be brazed to both faces of the disc simultaneously.

My improved pastes conform to all of the desirable attributes set forth in the Klinker Patent 2,566,339 supra, but in addition possess adhesive, non-running and bridging qualities not found in those pastes. These improved qualities are secured by utilizing in the hydrocarbon vehicle of the pastes low-Conradson value, heat-depolymerizable polymers prepared from butenes. Such butene polymers can be prepared so as to have moderately high molecular weights, thereby giving products of heavy body. The body or viscosity can range rather widely for brazing paste usage since the viscosity need only be high enough to maintain the brazing metal powder and/or powdered metal-yielding compounds in a substantially non-settling condition. Since the specific gravities of the powders used in formulations adapted for different brazing tasks can vary widely, one formulation may need a higher viscosity polybutene than is needed in some other formulation. Generally the viscosity should be above about D (Gardner-Holdt, 25° C.) and I especially prefer polymers having a viscosity above about Z (Gardner-Holdt, 25° C.). The polymers in the commercial Caloria products referred to below have a viscosity well above $Z_6$ (Gardner-Holdt, 25° C.).

Polybutenes of high viscosity are currently available as articles of commerce, usually in the form of 10–40% solutions containing polybutene dissolved in mineral base lubricating oil(s). Such solutions have been prepared for use as modifiers for lubricating oils and greases and frequently contain small amounts of aromatic condensates and/or ester-type metal wetting and lubricity agents. These small amounts of non-polybutene products do not impair the usefulness of the polybutene solutions in brazing pastes, and in fact are somewhat helpful in securing easy dispersion of the brazing metal components in the vehicle, and in promoting a stable, non-settling condition through improved wetting effects. Hence the available solutions, although made up for a different end use, serve admirably for brazing paste vehicle components. However, the polybutenes per se can be prepared and used equally well in brazing pastes, since with them one can make up his own solutions in whatever mineral base lubricating oil stock he may choose. Metal-wetting agents and other modifiers of his choice can then be added if needed. For commercial brazing pastes, however, I have found the presently-available solutions mentioned above to be well suited. Such solutions have very low Conradson values (less than .1%) so that they give practically no carbon deposits on articles brazed in conventional ways by induction heating or by use of the usual controlled atmosphere brazing furnaces.

Whether one uses the polybutenes per se, or the available mineral oil solutions thereof, the brazing paste vehicle can be thinned as much or as little as needed to secure desired flow qualities consistent with stable, non-settling dispersions of brazing metal component(s). It will be understood that if low viscosity polybutenes are employed, then little or no thinning may be needed, whereas if one secures the very high viscosity polybutenes, much more thinning will be necessary to prepare a paste which can be easily applied from a pressure-type oiler or like dispensing devices. The thinner employed where appreciable in quantity should, of course, have a Conradson value which is low enough to give a vehicle having a Conradson value below .5% and preferably below .1%. Solutions of high viscosity polybutenes currently available from the Penola Oil Company and marketed as Caloria 40–M, Caloria 50 and Caloria 150 have low Conradson mineral base lubricating oil thinners in them.

Some of the significant properties of the products are given in the following table:

TABLE I

| Property | Caloria 40-M | Caloria 50 | Caloria 150 |
|---|---|---|---|
| Gravity—API | 38.5 | 39.6 | 39.0 |
| Color—Rob | 24½ | 25+ | |
| Flash—open cup, °F | 150 | 260 | 260 |
| Fire, °F | 165 | 285 | 280 |
| Pour, °F | +30 | +20 | +25 |
| Visc., SUS at 100° F | 189,000 | 101 | 499 |
| Visc., SUS at 210° F | 40,000 | 50 | 149 |
| Polybutene, percent | About 39 | About 6 | About 8 |
| Volatile light petroleum oil, percent | About 56 | About 90 | About 90 |
| Liquid organic ester, percent | 5 | 3.8 | .5 |
| Aromatic hydrocarbon condensate,[1] percent | | | 1.5 |
| Viscosity (Gardner-Holdt, 25° C.) | Z 6+ | A— | D+ |
| Conradson value, percent | .008 | .0036 | .005 |

[1] Infrared spectrum identical with National Bureau of Standards Card 248 (plasticizer grade).

It will be noted that the Caloria 40-M product has unusual properties in its low flash and fire points and its very high viscosity at 210° F. The Caloria products have the already-described quality of polybutenes of not spreading on high temperature surfaces. I have observed that there is instead a tendency for the products, particularly the high viscosity polybutenes, to draw together somewhat when heated. The Caloria 40-M product, as an example of such a polybutene, also exhibits excellent adhesiveness even when being heated sufficiently to be decomposed, and hence is eminently useful as the base of a brazing paste adapted for use on the underside of assemblies which are to be brazed. The adhesiveness acts to hold the brazing materials of the paste in place at the intended joint, and as mentioned above, can be used additionally to cause abrasive powders to be held in place against the pull of gravity so that when the brazing temperature is reached the abrasive powders can be successfully brazed to the assembly. The high viscosity polybutenes, such as in the Caloria 40-M solution, also aid in causing a brazing paste to produce a sound joint when the parts have a poor fit with each other. This bridging action is due in part to the adhesive quality of high viscosity polybutenes and in part to the coalescing tendency when heated.

It will be understood that the above described butene polymers or their low Conradson solutions can be converted to brazing pastes by adding any desired brazing materials thereto to form a dispersed, powdery brazing component. As the Klinker patents teach, the brazing materials so added can be metal powders, alloy powders, mixtures of metal and/or alloy powders, metal compounds which under the conditions of temperature and/or atmosphere prevailing during the brazing operation are capable of yielding brazing metal(s), or mixtures of such compounds with metal powder(s) and/or powdered alloy(s).

Fluxes appropriate to the metals being joined and to the brazing component of the paste can also be included if desired or needed to improve wetting and to secure sound joints.

The free-flowing qualities of a brazing paste of the invention, such as the flowability from a plunger-actuated dispenser, or the flowability needed for brush, spray or dip application can be secured by thinning a base such as that represented by Caloria 40-M with the more fluid polymeric materials represented by Caloria 50 or Caloria 150, or by thinning with low Conradson value mineral base lubricating oils of appropriate viscosity. Thinning can also be effected with other heat depolymerizable low-Conradson value hydrocarbon gel polymers of the types disclosed in the Klinker Patent 2,566,339 supra. While drying oils, preferably hydrocarbon drying oils, can be included in the pastes for the functions described in said Klinker patent, such drying oils seldom are needed with the pastes of this invention since the highly viscous butene polymers impart sufficient adhesiveness and resistance to movement as to retain the paste in its applied position on an assembly even when the assembly is subjected to sudden shock (as by accidental bumping of the assembly) or to vibration prior to or during its passage into and through the brazing zone of a furnace. Of course, if low viscosity (e.g., D viscosity, Gardner-Holdt) polybutenes constitute the polybutenes of the paste's vehicle, then drying oils can be added for the above purposes.

The brazing pastes of the invention can be used not only for furnace-brazing, but can be used as well for torch or induction brazing. The low Conradson values of the polybutenes and of their solutions in appropriate oils are especially significant in such pastes. Soft solder pastes can be prepared from the above described polymers or their solutions, especially from low flash polymer solutions of the type represented by Caloria 40-M, since the heat of a low temperature soldering torch soon causes such a solution to take fire and burn away without leaving harmful or unsightly carbonaceous residues.

The following examples illustrate the principles of my invention and include the best modes presently known to me for practicing those principles.

*Example 1*

An abrasive disc having tungsten carbide abrasive grit brazed to its faces and its edge was prepared by coating the faces and edge with a brazing paste formulated as indicated below, then sifting the abrasive grit onto the coated areas, and finally inserting the assembly into a brazing furnace while held in a position such as that shown in the attached figure of drawings. There the ferrous metal disc 1 after being coated with brazing paste and tungsten carbide grit 2 is supported at its bore hole by a stand 3 so as to retain the disc in a substantially horizontal position within the heating chamber 4 of a controlled, reducing atmosphere brazing furnace 5. After being heated to the brazing temperature (about 2050° F.), the disc was cooled in the nonoxidizing atmosphere and then removed. Upon examination the abrasive disc was found to have the tungsten carbide grit brazed soundly thereto. The brazing paste used in preparing the abrasive disc was formulated as follows:

| | Percent |
|---|---|
| Stearic-acid-free cuprous oxide | 82.6 |
| Caloria 40-M | 6.1 |
| Caloria 50 | 10.9 |
| Anhydrous borax | 0.4 |

NOTE.—Polybutene is about 18% by weight on the vehicle.

*Example 2*

The following formulations give pastes which are well suited for brazing steel parts together by induction heating at temperatures around 1650° F. for Paste 2A and 2050° F. for Paste 2B. A protective atmosphere is generally desirable, especially at the higher temperatures, but can be eliminated where rapid heating of the parts can be accomplished.

PASTE 2A

| | G. |
|---|---|
| 60% Cu–40 Zn brass powder | 917 |
| Zinc powder | 83 |
| Caloria 40-M | 255 |
| Anhydrous borax powder | 50 |

The zinc powder was included here to give a brass composed of about equal parts of copper and zinc. A prealloyed zinc powder and/or a mixture of copper powder and zinc powder in these proportions can be used. Prealloying of at least a major part of the zinc is preferred as a means to reduce the oxidation of zinc which tends to occur during heating, especially where a protective atmosphere is not present.

PASTE 2B

|  | G. |
|---|---|
| Copper powder (—200 mesh) | 1000 |
| Caloria 40–M | 255 |
| Caloria 50 | 55 |
| Anhydrous borax powder | 50 |

NOTE.—Polybutene is about 33.2% by weight on the vehicle.

*Example 3*

A furnace brazing paste adapted for use in preparing abrasive discs of the type described in Example 1 was formulated as follows:

|  | G. |
|---|---|
| Stearic-acid-treated cuprous oxide | 1500 |
| Caloria 150 | 171 |
| Anhydrous borax powder | 8 |

This paste can be applied by conventional silk-screen methods if desired, so as to restrict its application to the desired areas of the disc.

*Example 4*

A brazing paste adapted for general use in torch, induction or furnace brazing was formulated as follows:

|  | G. |
|---|---|
| Copper powder (—200 mesh) | 600 |
| Caloria 40–M | 165 |
| Caloria 50 | 15 |

NOTE.—Polybutene is about 36.4% by weight on the vehicle.

For torch and induction heating, 30 g. anhydrous borax should be added; this flux is optional for furnace brazing or wherever a protective atmosphere is used.

*Example 5*

Pastes adapted for joining iron, steel and other metals at temperatures between about 1000° F. and 1600° F. were formulated as follows:

| Paste 5A (92% Cu—8% P) | G. | Can Be |
|---|---|---|
|  |  | *Percent* |
| Copper powder (—200 mesh) | 50 | 50–85 |
| 85% Cu–15% phosphorous alloy powder | 50 | |
| Caloria 40–M | 25 | 10–25 |
| Flux [1] (optional) | 30 | 5–25 |
|  |  | 100 |

[1] A mixture of anhydrous powders of metal halides, such as: Zinc halide 24–60%, e.g., zinc chloride 33%; tin halide 30–75%, e.g., tin chloride 34%; alkali halide 8–35%, e.g., potassium chloride 33%.

| Paste 5B (88% Cu—6% P—6% Ag) | G. | Can Be |
|---|---|---|
|  |  | *Percent* |
| Copper powder (—200 mesh) | 54 | 50–85 |
| 85% Cu–15% P alloy powder | 40 | |
| Silver powder | 6 | |
| Caloria 40–M | 25 | 10–25 |
| Flux as in Paste 5A (optional) |  | 5–25 |

| Paste 5C (88% Cu—5% P—15% Ag) | G. | Can Be |
|---|---|---|
|  |  | *Percent* |
| Copper powder (—200 mesh) | 51.7 | 50–85 |
| 85% Cu–15% P alloy powder | 33.3 | |
| Silver powder | 15.0 | |
| Caloria 40–M | 25.0 | 10–25 |
| Flux as in Paste 5A (optional) |  | 5–25 |

In these pastes, the flux can be eliminated when a dry (dew point —60° F. or lower) atmosphere exists. The copper powder can vary in particle size from about 5 microns to –40 mesh; –200 mesh is preferred. As much as 70% of the Caloria 40–M polymer can be replaced with Caloria 50; that is, the polybutene content can be as low as 15.9% of the vehicle by weight. Where lighter brazing metal components are used, the polybutene content can be as little as 8%. In general, I prefer between about 15% and 60% by weight.

*Example 6*

An abrasive disc of the type described in Examples 1 and 3, but using a copper disc as the metallic base, was prepared by applying to the perimeter and to predetermined areas of the faces a film of brazing paste 5A (flux omitted), and then applying tungsten carbide powder to the filmed areas. The coated disc was then brazed in a furnace having a dry protective atmosphere of hydrogen or dissociated ammonia (dew point —60° F. or lower).

The invention is not restricted to the preparation of brazing pastes of the types shown in the examples since those skilled in the art will recognize that all the ramifications mentioned in the Klinker patents supra can be utilized in various formulations which are made up to meet the requirements of special brazing tasks involving one or more of the host of metals and alloys which one may want to secure together by means of brazed joints. The examples accordingly are merely illustrative of the principles of the invention.

In the same sense, the Caloria solutions have been used in the examples to illustrate the merits of polybutenes as secured in the form of their mineral oil solutions. Solutions from other sources, or comparable solutions made up in situ from the polybutenes and appropriate thinners, can be used in their stead.

Having now described my invention, what I claim is:

1. In a brazing paste having powdery particles of brazing metal components dispersed in a heat depolymerizable hydrocarbyl vehicle having a Conradson value below about .5%, the improvement which consists in having present in said vehicle at least 8% by weight thereof of heat-depolymerizable butene polymer having a viscosity of at least D on the Gardner-Holdt scale at 25° C.; said hydrocarbyl vehicle being composed essentially of material selected from the group consisting of said butene polymer, mixtures of said butene polymer with mineral base lubricating oil, mixtures of said butene polymer with synthetic, polymeric heat-depolymerizable hydrocarbon gels, and mixtures of the aforesaid materials.

2. An improved brazing paste as claimed in claim 1 wherein the butene polymer has a viscosity of at least Z on the Gardner-Holdt scale at 25° C.

3. An improved brazing paste as claimed in claim 2 wherein the butene polymer amounts to between about 15% and 60% by weight of the vehicle.

4. An improved brazing paste as claimed in claim 3 wherein the brazing metal component is composed mainly of cupriferous material in powdery form and amounts to 50–85% of the total weight of the paste, wherein the vehicle amounts to 10–25% of the total weight, and wherein the paste includes a powdered flux component amounting to about 5–25% of the total weight.

5. The method of preparing an abrasive article having particles of hard metal carbides brazed to opposite faces of a metal sheet, which comprises the steps of: applying a film of the brazing paste defined hereinbelow to predetermined areas of said opposite faces, then applying powdery particles of said metal carbides to said applied films, and thereafter simultaneously brazing the carbide particles of both faces to said sheet by subjecting said prepared sheet to brazing conditions of atmosphere and elevated temperature appropriate to the brazing metal component of said paste; said brazing paste being composed essentially of powdery particles of brazing metal components dispersed in a heat-depolymerizable hydrocarbyl vehicle having a Conradson value below about 0.5% and having present therein at least 8% by weight thereof of heat-depolymerizable butene polymer having a viscosity of at least D on the Gardner-Holdt scale at 25°C., said hydrocarbyl vehicle being composed essentially of material selected from the group consisting of said butene polymer, mixtures of said butene polymer with mineral base lubricating oil, mixtures of said butene polymer with synthetic, polymeric, heat-depolymerizable hydrocarbon gels, and mixtures of the aforesaid materials.

6. The method as claimed in claim 5 wherein said metal sheet is composed of ferrous metal, wherein the metal carbide particles are composed of tungsten carbide, wherein the powdery brazing metal component of said brazing paste is composed essentially of cuprous oxide, and wherein the vehicle of said paste has a viscosity of about $Z_6$ on the Gardner-Holdt scale at 25° C.

7. The method as claimed in claim 5 wherein the metal sheet is composed of copper, wherein the metal carbide particles are composed of tungsten carbide, and wherein the vehicle of said paste has a viscosity of about $Z_6$ on the Gardner-Holdt scale at 25° C.

References Cited in the file of this patent

UNITED STATES PATENTS

| | | |
|---|---|---|
| 2,566,339 | Klinker | Sept. 4, 1951 |
| 2,606,132 | Klinker | Aug. 5, 1952 |
| 2,714,760 | Boam et al. | Aug. 9, 1955 |